(12) United States Patent
Trager et al.

(10) Patent No.: US 7,889,812 B2
(45) Date of Patent: Feb. 15, 2011

(54) DIRECT DIGITAL FREQUENCY SYNTHESIZER WITH PHASE ERROR CORRECTION, METHOD THEREFOR, AND RECEIVER USING SAME

(75) Inventors: David S. Trager, San Marcos, TX (US); Mitchell Reid, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 913 days.

(21) Appl. No.: 11/442,195

(22) Filed: May 26, 2006

(65) Prior Publication Data

US 2008/0123777 A1    May 29, 2008

(51) Int. Cl.
*H03K 9/00* (2006.01)
*H03D 3/00* (2006.01)
*H03M 1/66* (2006.01)

(52) U.S. Cl. .................. 375/316; 375/322; 341/144
(58) Field of Classification Search .............. 375/316, 375/322; 341/144
See application file for complete search history.

(56) References Cited

U.S. PATENT DOCUMENTS

| | | | | |
|---|---|---|---|---|
| 3,641,565 | A * | 2/1972 | Ivers et al. | 341/116 |
| 4,635,279 | A * | 1/1987 | Nossen | 375/322 |
| 4,710,770 | A * | 12/1987 | Hakata et al. | 340/870.18 |
| 5,805,871 | A * | 9/1998 | Baxter | 713/500 |
| 5,999,581 | A * | 12/1999 | Bellaouar et al. | 375/377 |
| 6,278,745 | B1 * | 8/2001 | Lennen | 375/316 |
| 6,778,117 | B1 * | 8/2004 | Johnson | 341/144 |
| 7,602,127 | B2 * | 10/2009 | Coumou | 315/111.21 |
| 2002/0058490 | A1 * | 5/2002 | Sorrells et al. | 455/313 |
| 2005/0193047 | A1 * | 9/2005 | Fu et al. | 708/300 |
| 2006/0025096 | A1 * | 2/2006 | Jaffe et al. | 455/260 |

OTHER PUBLICATIONS

"A Direct Digital Frequency Synthesizer Prototype for Space Applications," Richard C. Meitzler et al., Johns Hopkins University, Applied Physics Laboratory, Laurel Maryland.

"A Low Power Direct Digital Frequency Synthesizer with 60 dBc Spectral Purity," J.M.P. Langlois et al., Department of Electrical and Computer Engineering, Ontario, Canada, Apr. 2002.

(Continued)

*Primary Examiner*—Mohammad H Ghayour
*Assistant Examiner*—Sarah Hassan
(74) *Attorney, Agent, or Firm*—Polansky & Associates, P.L.L.C.; Paul J. Polansky (57) ABSTRACT

A receiver (1000) includes a direct digital frequency synthesizer (DDFS) (700) and first (1040) and second (1042) mixers. The DDFS (700) has a first output for providing a first local oscillator signal, and a second output for providing a second local oscillator signal offset from a quadrature relationship with the first local oscillator signal by a phase offset. The first mixer (1040) has a first input for receiving a radio frequency (RF) signal, a second input for receiving the first local oscillator signal, and an output for providing an in-phase signal at another frequency. The second mixer (1042) has a first input for receiving the RF signal, a second input for receiving the second local oscillator signal, and an output for providing a quadrature signal at the other frequency. The DDFS (700) may be implemented using first (702) and second (704) memories storing portions of a sinusoidal waveform and extra memories (706, 708) supporting the phase offset.

20 Claims, 6 Drawing Sheets

OTHER PUBLICATIONS

"200 MHz Quadrature Digital Synthesizer/Mixer in 0.8-mM CMOS," Loke Kun Tan et al.; Broadband Telecom, Inc., IEEE IC Conf., 1994.

"The Optimization of Direct Digital Frequency Synthesizer Performance in the Presence of Finite Word Length Effects," H. T. Nicholas et al., 42nd Annual Frequency Control Symposium—1988, pp. 357-363.

"A 150-MHz Direct Digital Frequency Synthesizer in 1.25um CMOS with -90-dBC Spurious Performance," H. T. Nicholas et al., IEEE Journal of Solid State Circuits, vol. 26, pp. 1959-1969, Dec. 1991.

* cited by examiner

DIRECT DIGITAL FREQUENCY SYNTHESIZER WITH PHASE ERROR CORRECTION, METHOD THEREFOR, AND RECEIVER USING SAME

FIELD OF THE DISCLOSURE

This disclosure generally relates to radio frequency (RF) signal receivers, and more particularly to direct digital frequency synthesizers suitable for use in such receivers.

BACKGROUND

Modern broadcast communications systems transmit and receive information by way of transmitters that modulate a radio frequency (RF) carrier signal with an information signal. The information signal can be at a much lower frequency than the RF signal. Corresponding receivers then demodulate the transmitted signal to recover the information signal.

Such RF receivers typically use some form of heterodyning to convert a received RF signal to a lower frequency signal (sometimes called an intermediate frequency signal), which may be easier to filter. Generally, heterodyning refers to a process of mixing (or multiplying) a first signal with a second signal having a frequency that is close to that of the first signal. In this instance, the RF signal is multiplied with a local oscillator signal (LO signal). Mixing the two signals results in two signals, a first signal having a frequency equal to the sum of the RF frequency and the LO frequency, and a second signal having a frequency equal to the difference between the RF and the LO frequencies. The first frequency is higher than either the RF or LO frequency, and is usually filtered readily using a simple low-pass filter. The difference frequency is the intermediate frequency (IF), which can be manipulated using fixed frequency filters.

Unfortunately, typical heterodyne-based systems are susceptible to a phenomenon referred to as imaging. Imaging refers to a signaling phenomenon whereby two different RF signals are translated to the same intermediate frequency, thereby causing interference. In general, a desired RF frequency $f_{RF}$ differs from a given LO signal frequency $f_{LO}$ by the IF frequency $f_{IF}$. A desired radio frequency may lie either above or below the LO signal frequency. However, due to its symmetric properties, heterodyning systems sometimes select any RF signal differing from $f_{LO}$ by $f_{IF}$, regardless of whether the RF signal lies above or below $f_{LO}$. For example, if a desired RF signal has a frequency of 1.01 GHz and the LO signal has a frequency of 1.00 GHz, the two signals can be mixed to produce an IF signal having an IF frequency of 10 MHz. However, if there is a second RF signal with a frequency of about 990 MHz, the receiver will mix both the 1.01 GHz and the 990 MHz signals to the same frequency of 10 MHz, thereby causing interference with the desired signal. The image frequency can be, for example, the frequency corresponding to the sum of $f_{LO}$ and $f_{IF}$.

To prevent interference with the desired RF signal, some communication systems use quadrature receiver architectures for mixing the RF signal using two local oscillator signals in quadrature with each other. One of the paths is typically referred to as an in-phase (I) signal path, and the other path is typically referred to as a quadrature (Q) signal path.

If the LO signal applied to the I signal path is exactly 90 degrees out of phase with the LO signal applied to the Q signal path, and if the I path and the Q path circuits are identically matched in terms of amplitude and phase, then the image signal can be perfectly rejected from the desired signal. This property allows quadrature IF mixing to cancel image signals without expensive and bulky rejection filters. However, if any non-idealities exist in the LO signals (e.g. imperfect 90 degree phase difference) or if the I and Q paths are imbalanced or mismatched (phase, amplitude, and so on), then the gain and phase of the I/Q path circuits will cause the image signal to leak into the desired signal, resulting in imperfect image cancellation.

To improve image rejection or cancellation, some receivers are calibrated by using a calibration tone to measure mismatches in the I and Q paths. Then the I path or the Q path is compensated in response to the measured mismatch, improving image rejection.

Recently, advances in integrated circuit technology have allowed nearly all of a complete receiver to be integrated onto a single silicon chip. One of the problems introduced by such high degree of integration has been that the LO mixing signals produced by oscillators can radiate into adjacent circuitry, creating spurs or tones that degrade performance. Richard A. Johnson in U.S. Pat. No. 6,778,117 discloses a receiver that uses a direct digital frequency synthesizer rather than a conventional oscillator to form a digital mixing signal. Since there is no circuit node that contains an actual oscillator signal, there is no mechanism for the local oscillator signal to leak or radiate into other circuits.

It would be desirable to utilize this and other advances in receiver design to provide a receiver with high image rejection and low cost.

SUMMARY

In one form, a direct digital frequency synthesizer includes first and second memories, first and second extra memories, and an access circuit. The first memory stores a plurality of digitized samples of a first portion of a sinusoidal waveform. The second memory stores a plurality of digitized samples of a second portion of the sinusoidal waveform. The first and second portions of the sinusoidal waveform together define a predetermined fraction of a whole cycle of the sinusoidal waveform. The first extra memory stores a plurality of extra digitized samples of the sinusoidal waveform beyond the first portion. The second extra memory stores a plurality of extra digitized samples of the sinusoidal waveform beyond the second portion. The access circuit is responsive to the digitized samples from the first and second memories and to the digitized samples of the first and second extra memories for outputting cosine and sine waveforms having a phase offset with respect to each other.

In another form, digitized samples of a first portion of a sinusoidal waveform are stored in a first memory, and digitized samples of a second portion of the sinusoidal waveform are stored in a second memory. The first and second portions of the sinusoidal waveform together define a predetermined fraction of a whole cycle of the sinusoidal waveform wherein the predetermined fraction exhibits symmetry with respect to the whole cycle. Extra digitized samples of the sinusoidal waveform beyond the first portion are stored in a first extra memory. Extra digitized samples of the sinusoidal waveform beyond the second portion are stored in a second extra memory. Cosine and sine waveforms having a phase offset with respect to each other are concurrently outputted from the digitized samples of the first and second memories and the first and second extra memories.

In yet another form, a receiver includes a direct digital frequency synthesizer and first and second mixers. The direct digital frequency synthesizer has a first output for providing a first local oscillator signal, and a second output for providing a second local oscillator signal offset from a quadrature relationship with the first local oscillator signal by a phase offset. The first mixer has a first input for receiving a radio frequency (RF) signal, a second input for receiving the first local oscillator signal, and an output for providing an in-phase signal at another frequency. The second mixer has a first input for receiving the RF signal, a second input for receiving the second local oscillator signal, and an output for providing a quadrature signal at the other frequency.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
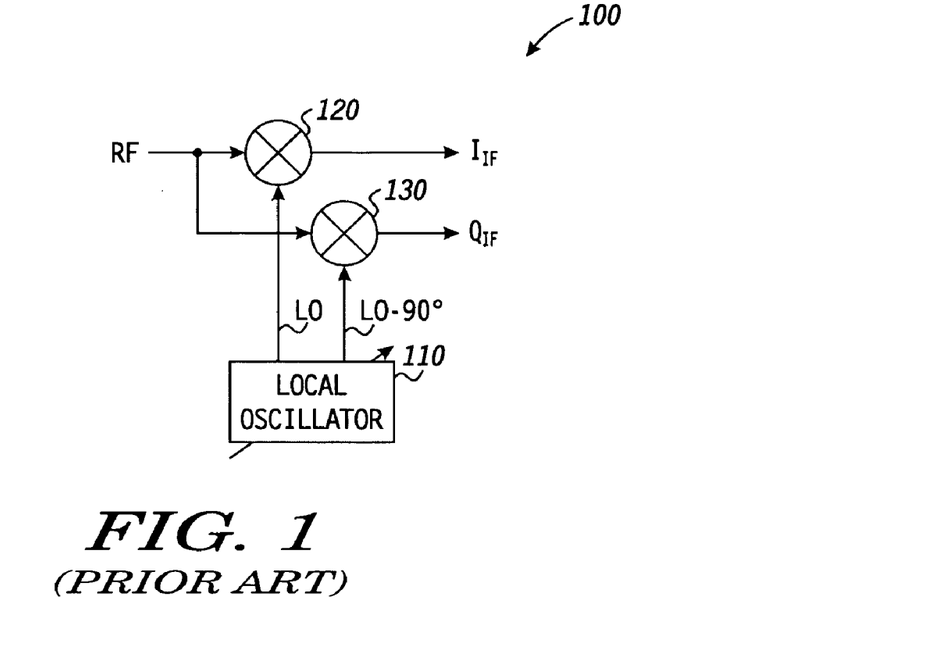
FIG. 1 illustrates in block diagram form a quadrature mixer known in the prior art.

FIG. 1 illustrates in block diagram form a quadrature mixer 100 known in the prior art. Quadrature mixer 100 includes generally a tunable local oscillator 110, a first multiplier 120, and a second multiplier 130. Tunable local oscillator 110 has a tuning input, a first output for providing a first local oscillator signal labeled "LO" and a second local oscillator signal labeled "LO−90°". The LO and LO−90° signals can be formed by cosine and sine signals, respectively, since a sine waveform is 90 degrees out of phase with respect to the corresponding cosine waveform. Multiplier 120 has a first input terminal for receiving a radio frequency (RF) input signal labeled "RF", a second input connected to the first output of tunable local oscillator 110, and an output for providing an in-phase intermediate frequency signal (IF) labeled "$I_{IF}$". As used herein, "radio frequency signal" means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc. Multiplier 130 has a first input terminal for receiving signal RF, a second input connected to the second output of tunable local oscillator 110, and an output for providing a quadrature IF signal labeled "$Q_{IF}$".

Mixer 100 mixes the RF signal into an IF signal that is more suitable for processing. Thus mixer 100 may be part of a heterodyne radio in which the RF signal is first filtered in a coarse RF filter, then converted to IF using tunable local oscillator 110, and then filtered at a fixed IF using a high quality filter. As is well known in radio engineering, separating the signal into in-phase and quadrature components using the two local oscillator outputs in quadrature with each other allows the image frequency to be cancelled. The degree of cancellation will depend on the precision of the components used in the I and Q paths as well as the quality of the LO and LO−90° mixing signals.

However tunable local oscillator 110 can create spurs or tones that get reflected into other circuitry, causing unwanted interference, especially when the components of mixer 100 are integrated together in a single silicon chip. As referenced above, Richard A. Johnson discloses another approach in U.S. Pat. No. 6,778,117, in which a direct digital frequency synthesizer is used to form digital local oscillator signals that are then used to mix the RF signal to IF. This approach can be better understood with reference to FIG. 2, which illustrates in block diagram form a quadrature mixer 200 using a direct digital frequency synthesizer (DDFS) 210 according to the prior art. Quadrature mixer 200 also includes multipliers 220 and 230. DDFS 210 has a first input for receiving an input frequency signal labeled "F", a first output for providing a first local oscillator signal labeled "LO", and a second local oscillator signal labeled "LO−90°". Multiplier 220 has a first input for receiving the RF input signal, a second input connected to the first output of DDFS 210, and an output for providing in-phase IF signal $I_{IF}$. Multiplier 230 has a first input for receiving the RF input signal, a second input connected to the second output of tunable local oscillator 110, and an output for providing quadrature IF signal $Q_{IF}$.

Figure 2:
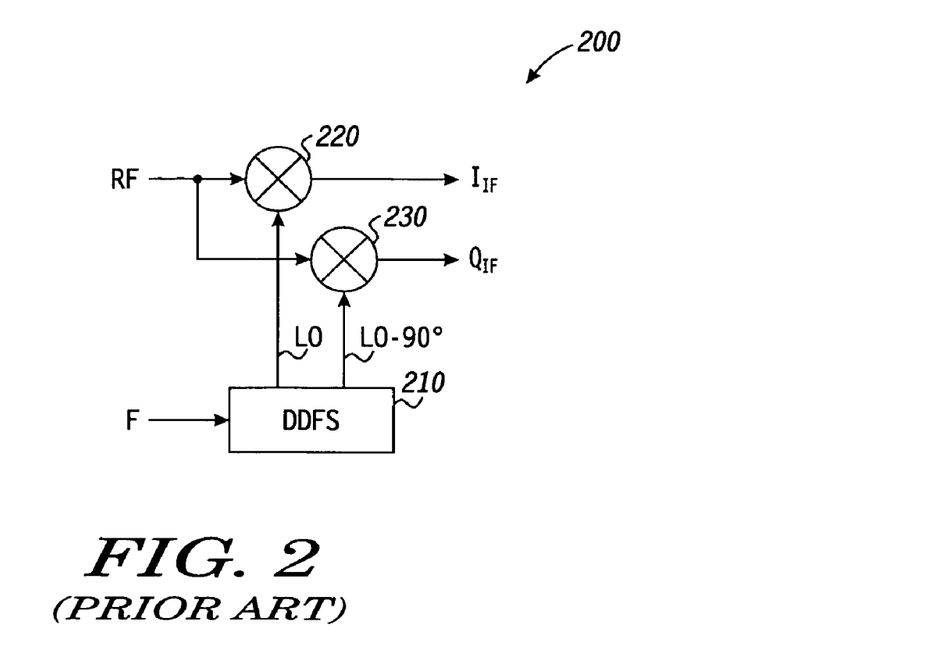
FIG. 2 illustrates in block diagram form a quadrature mixer using a direct digital frequency synthesizer (DDFS) known in the prior art.

Mixer 200 avoids creating spurs or tones by using direct digital frequency synthesizer 210 instead of an analog local oscillator. Since the mixing signals are digital samples of cosine and sine waveforms rather than the waveforms themselves, there are no signals to radiate and affect other circuitry. Thus mixer 200 is suitable for integration with other components of the receiver.

There are several known DDFS architectures. The cosine and sine functions can be generated in a number of ways, including by digital resonator circuits (infinite impulse response filters), by iterative approximation techniques (e.g. the "CORDIC" algorithm), and by table look-up approaches. In practice, the table look-up approach is often used because a variety of simplifications can be performed by taking advantage of trigonometric symmetry properties of the cosine and sine functions.

Figure 3:
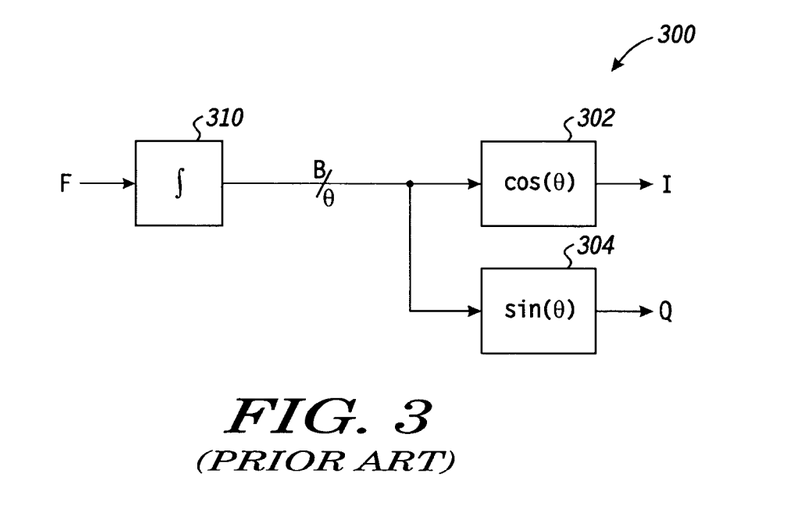
FIG. 3 illustrates in block diagram form a circuit implementation of a DDFS according to the prior art.

FIG. 3 illustrates in block diagram form a first DDFS 300 according to the prior art. DDFS 300 includes a cosine memory 302, a sine memory 304, and an integrator 310. Cosine memory 302 has an address input terminal for receiving a B-bit address, and a data output terminal for providing an in-phase local oscillator signal labeled "I". Sine memory 304 has an address input terminal for receiving the B-bit address, and a data output terminal for providing a quadrature local oscillator signal labeled "Q". Integrator 310 has an input terminal for receiving a frequency control signal F, and an output terminal connected to the address input terminals of cosine memory 302 and sine memory 304 for providing an angle signal labeled "θ" thereto.

Cosine memory 302 stores digitized samples of one period of a cosine waveform, whereas sine memory 304 stores digitized samples of one period of a sine waveform. Integrator 310, which is also referred to as a phase accumulator, is a discrete-time integrator that represents the angle θ using a B-bit two's complement word. The rate at which integrator 310 crosses a fixed point (such as by rolling over at 0) corresponds to the frequency of oscillation. Input signal F selects the output frequency according to the following relation:

$$\text{output frequency} = F/T \ast 2^B \quad [1]$$

wherein T is the period of the clock signal that is used to clock integrator 310 (not shown in FIG. 2). Each of the cosine and sine memories is a look-up table storing a complete cycle of the sine and cosine waveforms, i.e. values corresponding to angles from 0 to $2\pi$.

Figure 4:
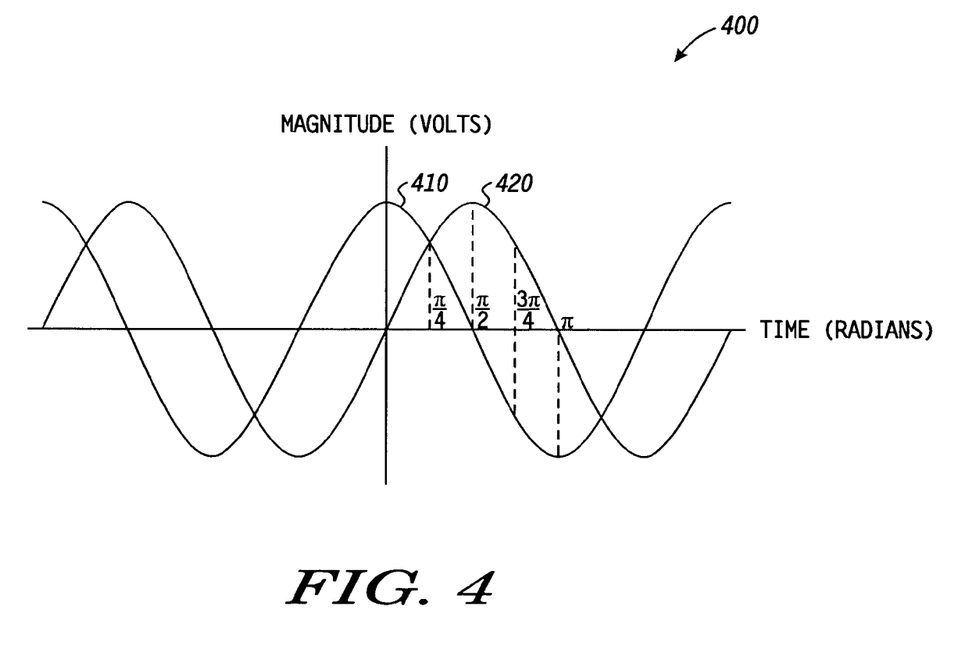
FIG. 4 illustrates a timing diagram of sine and cosine waveforms useful in understanding the operation of the DDFS of FIG. 3.

While the design of DDFS 300 is straightforward, it also requires a significant amount of circuit area to store digital samples of the complete cycles of both the cosine and sine waveforms. Reference is now made to FIG. 4, which illustrates a timing diagram 400 of cosine and sine waveforms useful in understanding the operation of DDFS 300 of FIG. 3. In FIG. 4 the horizontal axis represents time in seconds, and the vertical axis magnitude in volts. Timing diagram 400 includes a cosine waveform 410 and a sine waveform 420. To store a complete cycle of each waveform requires many digitized samples each with multiple bits. An inherent property of cosine and sine waveforms is that they have identical shape except that sine waveform 420 is delayed from cosine waveform 410 by 90°, or $\pi/2$. Another inherent property is that they have several points of symmetry with respect to their own waveforms. Cosine waveform 410 exhibits symmetry around one-half of its waveform, i.e. the first half of a whole cycle, for $\theta=0$ to $\pi$, is horizontally symmetric with respect to from the second half of a whole cycle, $\theta=\pi$ to $2\pi$. Cosine waveform 410 also exhibits symmetry around one-fourth of its waveform, i.e. the first fourth of a whole cycle, $\theta=0$ to $\pi/2$, is horizontally and vertically symmetric with respect to the second fourth of a whole cycle, $\theta=\pi/2$ to $\pi$. Moreover, cosine waveform 410 is horizontally symmetric with respect to sine waveform 420 around $\theta=\pi/4$.

Figure 5:
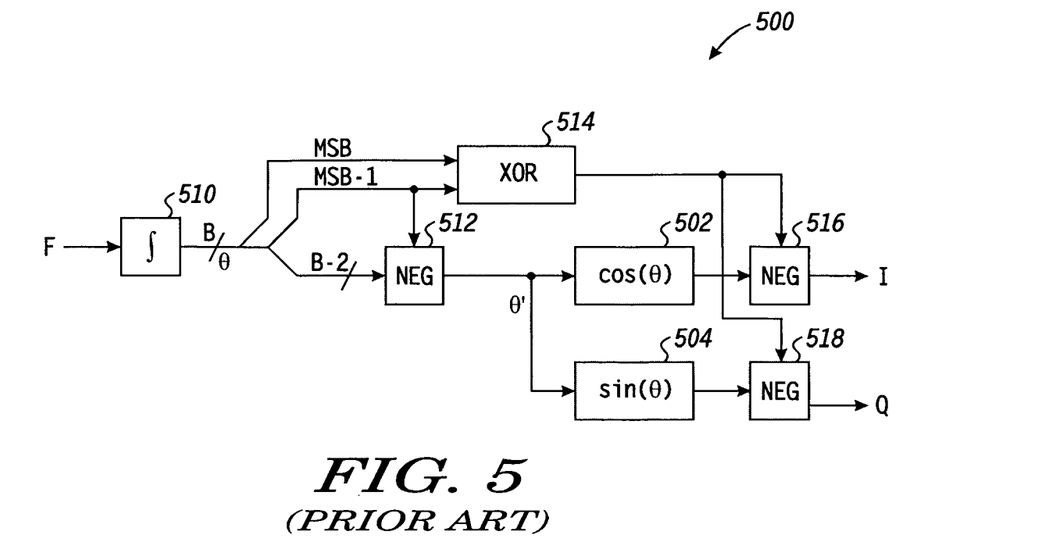
FIG. 5 illustrates in block diagram form another circuit implementation of a DDFS according to the prior art.

These symmetries can be exploited to reduce the area required for the lookup tables. FIG. 5 illustrates in block diagram form another circuit implementation of a DDFS 500 according to the prior art. DDFS 500 includes a cosine memory 502, a sine memory 504, an integrator 510, a negater 512 labeled "NEG", an exclusive OR (XOR) block 514, a negater 516, and a negater 518. Cosine memory 502 has an address input terminal for receiving the angle $\theta$, and a data output terminal, and stores digitized samples of a cosine waveform from 0 to $\pi/2$. Sine memory 504 has an address input terminal for receiving the angle $\theta$, and a data output terminal, and stores digitized samples of a sine waveform from 0 to $\pi/2$. Integrator 510 has an input terminal for receiving a frequency control signal F, and an output terminal for providing the B-bit angle $\theta$. Negater 512 has an input terminal for receiving the (B-2) bits of angle $\theta$, a control terminal for receiving the next most-significant bit of the angle $\theta$ labeled "MSB-1", and an output terminal for providing a modified angle labeled "$\theta$'" to the address inputs of cosine memory 502 and sine memory 504. XOR block 514 has a first input for receiving the MSB, a second input for receiving the MSB-1, and an output. Negater 516 has an input terminal connected to the data output terminal of cosine memory 502, a control input terminal connected to the output of XOR block 514, and an output terminal for providing the I signal. Negater 518 has an input terminal connected to the data output terminal of sine memory 504, a control input terminal for receiving the MSB of angle $\theta$, and an output terminal for providing the Q signal.

DDFS 500 uses the inherent trigonometric symmetries to store only one quadrant ($\theta=0$ to $\pi/2$) of digitized samples of the cosine and sine waveforms. DDFS 500 thus reduces the table sizes of memories 502 and 504 by a factor of four compared to the memories of DDFS 300 of FIG. 3. However, DDFS 500 requires a small amount of additional circuitry in order to selectively invert the sign of the table outputs at appropriate quadrant crossings. DDFS 500 achieves this by selectively negating the table outputs in quadrants 2 and 3 for the cosine waveform (determined by taking the logical XOR of the MSB and MSB-1 of angle $\theta$), and in quadrants 3 and 4 for the sine waveform (determined by the MSB of angle $\theta$). In addition, DDFS 500 mirrors the table addressing sequence when crossing from one quadrant to another. DDFS 500 performs this function by negating the output of integrator 510, which is used to address cosine memory 502 and sine memory 504, in quadrants 2 and 4 based on the MSB-1.

Figure 6:
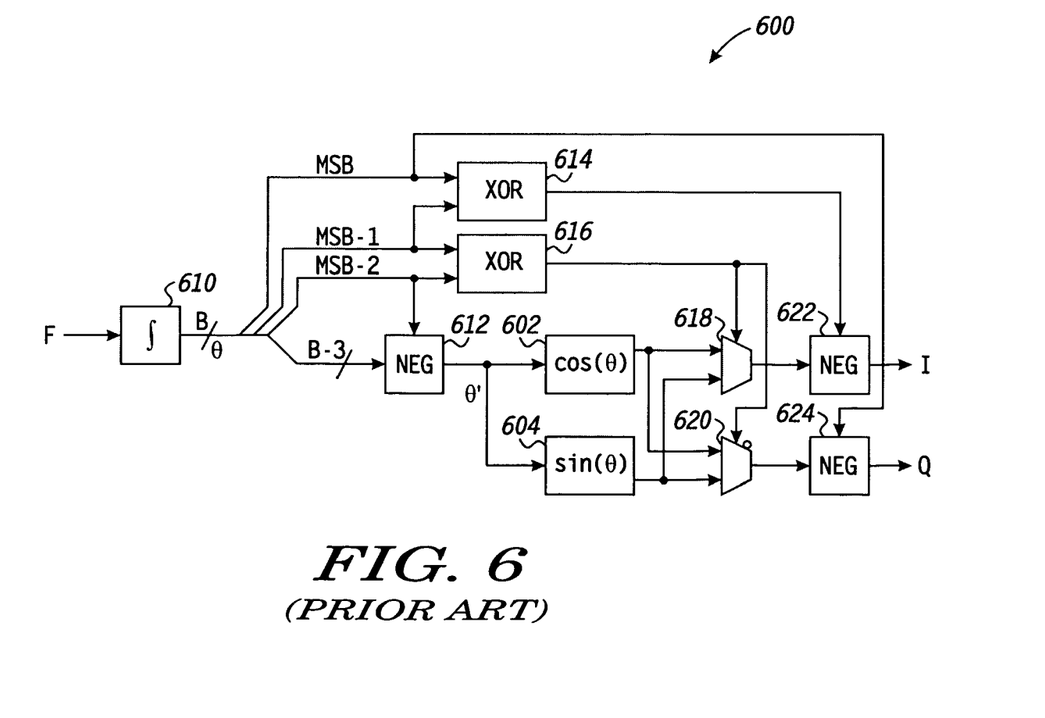
FIG. 6 illustrates in block diagram form yet another circuit implementation of a DDFS according to the prior art.

FIG. 6 illustrates in block diagram form yet another circuit implementation of a DDFS 600 according to the prior art. DDFS 600 includes a cosine memory 602, a sine memory 604, an integrator 610, a negater 612, an XOR gate 614, an XOR gate 616, a multiplexer (MUX) 618, a MUX 620, a negater 622, and a negater 624. Cosine memory 602 has an address input terminal, and a data output terminal, and stores digitized samples of a cosine waveform from 0 to $\pi/4$. Sine memory 604 has an address input terminal, and a data output terminal, and stores digitized samples of a sine waveform from 0 to $\pi/4$. Integrator 610 has an input terminal for receiving a frequency control signal F, and an output terminal for providing the B-bit angle $\theta$. Negater 612 has an input terminal for receiving the (B-3) bits of angle $\theta$, a control terminal for receiving the second next most-significant bit of the angle $\theta$ labeled "MSB-2", and an output terminal for providing the modified angle $\theta$' to the address input terminals of cosine memory 602 and sine memory 604. XOR gate 614 has a first input for receiving the MSB, a second input for receiving the MSB-1, and an output. XOR gate 616 has a first input for receiving the MSB-1, a second input for receiving the MSB-2, and an output. MUX 618 has a first input connected to the output of cosine memory 602, a second input connected to the output of sine memory 604, a control input connected to the output of XOR gate 616, and an output. MUX 620 has a first input connected to the output of cosine memory 602, a second input connected to the output of sine memory 604, an inverted control input connected to the output of XOR gate 616, and an output. Negater 622 has an input terminal connected to the output terminal of MUX 618, a control input terminal connected to the output of XOR gate 614, and an output terminal for providing the I signal. Negater 624 has an input terminal connected to the data output terminal of MUX 620, a control input terminal for receiving the MSB of angle $\theta$, and an output terminal for providing the Q signal.

DDFS 600 achieves further reduction in the table sizes by recognizing that the sine function over $(0, \pi/4)$ is symmetric with the cosine function over $(\pi/4, \pi/2)$. When the table address crosses the $\pi/4$ boundary, the output of XOR block 616 changes and MUXes 618 and 620 swap the outputs from cosine memory 602 and sine memory 604. As in DDFS 500 of FIG. 5, DDFS 600 uses negater 622 to selectively invert the output of MUX 618 in quadrants 2 and 3 (determined by taking the logical XOR of the MSB and MSB-1 of angle $\theta$), and to selectively invert the output of MUX 620 in quadrants 3 and 4 (determined by the MSB of angle $\theta$).

While adding a modest amount of further circuitry, DDFS 600 further reduces the table sizes compared to those in FIG. 5 by another factor of two.

Each DDFS described so far in FIGS. 3, 5, and 6 outputs cosine and sine waveforms that are identical to each other except for the 90° phase shift. However real circuitry used for quadrature mixers such as transistors and passive components cannot be perfectly matched and thus introduces a phase offset between the two local oscillator signals. If the phase offset is not cancelled, image rejection suffers.

The inventors discovered that when a DDFS is used instead of a conventional oscillator such as an LC tank oscillator to form the quadrature mixing signals, the DDFS can itself be used to improve image rejection. Since circuit non-idealities in the I and Q paths create phase mismatch, the DDFS can compensate for such mismatch by adding a corresponding phase offset to the I signal, the Q signal, or both the I and Q signals. Moreover a DDFS with such phase-offset capability can be integrated efficiently onto a single chip.

In addition, the inventors discovered that such a DDFS can be constructed efficiently, retaining the benefit of small size by being only slightly larger than DDFS 600 of FIG. 6.

Figure 7:
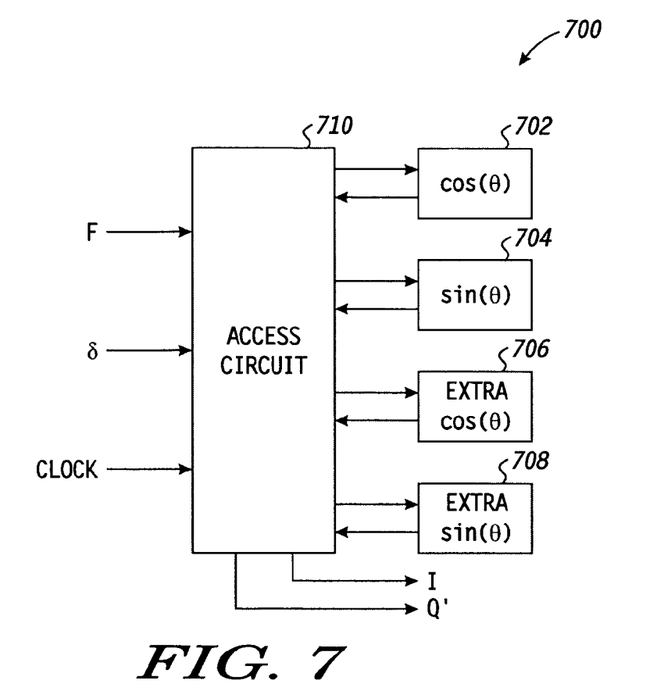
FIG. 7 illustrates in block diagram form a DDFS according to the present invention.

Such a DDFS is shown in FIG. 7, which illustrates in block diagram form a DDFS 700 according to the present invention. DDFS 700 includes generally a cosine memory 702, a sine memory 704, an extra cosine memory labeled "EXTRA cos ($\theta$)", an extra sine memory labeled "EXTRA sin($\theta$)", and an access circuit 710. Access circuit 710 has a first input terminal for receiving the phase offset $\delta$, a second input terminal for receiving the frequency F, a third input terminal for receiving a clock signal labeled "CLOCK", address output terminals and data input terminals connected to respective ones of memories 702-708, a first output terminal for providing a cosine signal labeled "I", and a second output terminal for providing an offset sine signal labeled "Q'".

Similar to DDFS 600 of FIG. 6, DDFS 700 operates using $\pi/4$ symmetry and thus cosine memory 702 and sine memory 704 would be only one-eighth the size of a corresponding memory that stored a complete cycle. In addition, however, DDFS 700 includes extra portions of the cosine and sine waveforms in separate memories to assist access circuit 710 in introducing the phase delay $\delta$. Thus $\delta$ identifies the desired phase delay to access circuit 710. Since phase delay $\delta$ can be varied based on the results of a calibration operation, DDFS 700 is able to adapt to variations in integrated circuit processing. In response, access circuit 710 provides an offset to the current address for the sine waveform. When the sine waveform is adjusted in phase, access circuit 710 reads from addresses that are offset by the value of $\delta$. During what would be periods of overlap, in which both the cosine and delayed sine waveforms would require values from the same memory, access circuit 710 accesses either extra cosine memory 706 or extra sine memory 708.

A phase offset can be created by adding a small $\delta$ value to one of the addresses, resulting in two address values. In the illustrated embodiment, the unmodified address is used for the I branch, whereas the modified address is used for the Q' branch. However, using two addresses introduces a new problem. Due to the trigonometric symmetry properties, the optimized structure has no overlap between the look-up tables. In other words, there is no value in the cosine look-up table that occurs in the sine look-up table. This means that at any instant, each look-up table is generating a result for one branch only. There is a problem, however, when the offset causes the cosine and sine outputs to be read from the same memory. This problem can happen, for example, when $\theta$ is slightly less that $\pi/4$ and a positive $\delta$ makes $\theta+\delta$ greater than $\pi/4$. In this case the cosine output needs to be read from the $\cos(\theta)$ memory, but the sine output also needs to be read from the $\cos(\theta)$ memory. The solution is to expand each of the tables (slightly) to accommodate the time when the same table would be required by both branch outputs. The amount of overlap is equal to the offset $\delta$ that needs to be supported.

Figure 8:
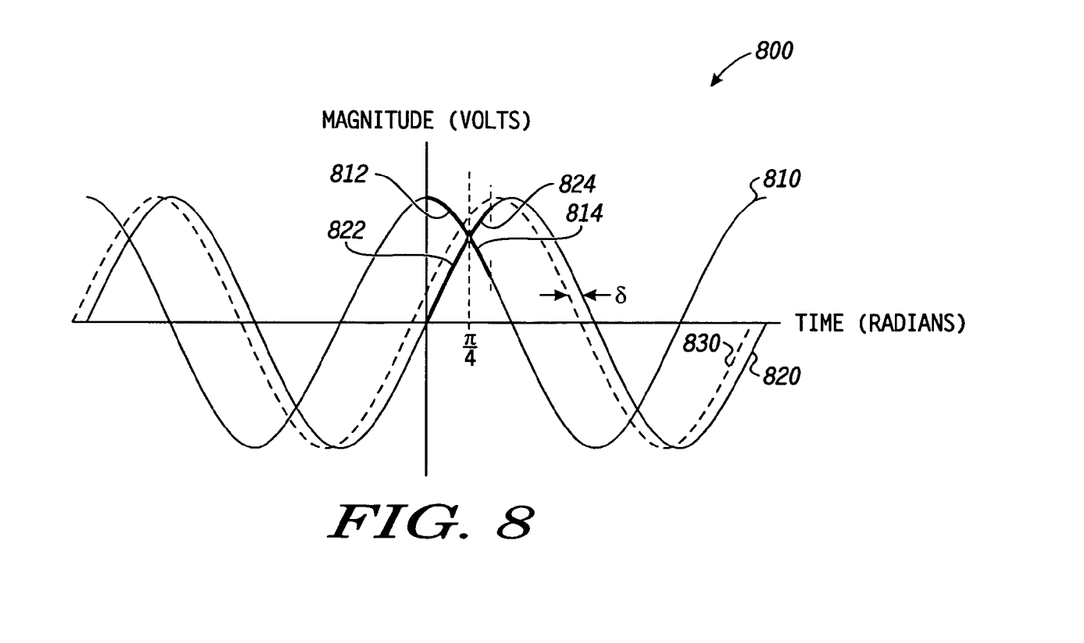
FIG. 8 illustrates a timing diagram of sine and cosine waveforms including a corrected sine waveform used in the DDFS of FIG. 7.

FIG. 8 illustrates a timing diagram 800 of sine and cosine waveforms including a corrected sine waveform 830 used in DDFS 700 of FIG. 7. In FIG. 8 the horizontal axis represents time in seconds, and the vertical axis represents magnitude in volts. A first waveform 810 represents the cosine waveform, a second waveform 820 represents the sine waveform, and a third waveform 830 represents the corrected sine waveform. With no phase offset, a first portion of cosine waveform 810 from 0 to $\pi/4$ can be used to construct a second portion of the sine waveform from $\pi/4$ to $\pi/2$, and that a first portion of sine waveform 820 from 0 to $\pi/4$ can be used to construct a second portion of the cosine waveform from $\pi/4$ to $\pi/2$. However with a finite phase offset cosine memory 702 cannot be accessed to form both the sine and the cosine waveforms at the same time (short of tuning them into dual-port memories). However, DDFS 700 includes extra cosine memory 706 and extra sine memory 708 so that access circuit 700 can continue outputting values while the other memory is being accessed. Such a system allows a phase offset to be introduced while preserving most of the benefits of $\pi/4$ symmetry.

Note that in the illustrated embodiment, the offset was added to the Q branch (sine waveform) of DDFS 700. In one alternate embodiment, the offset could be added to the I branch (cosine waveform) instead. In another alternate embodiment, the offset could be split in two, with half added to each of the I and Q branches.

Figure 9:
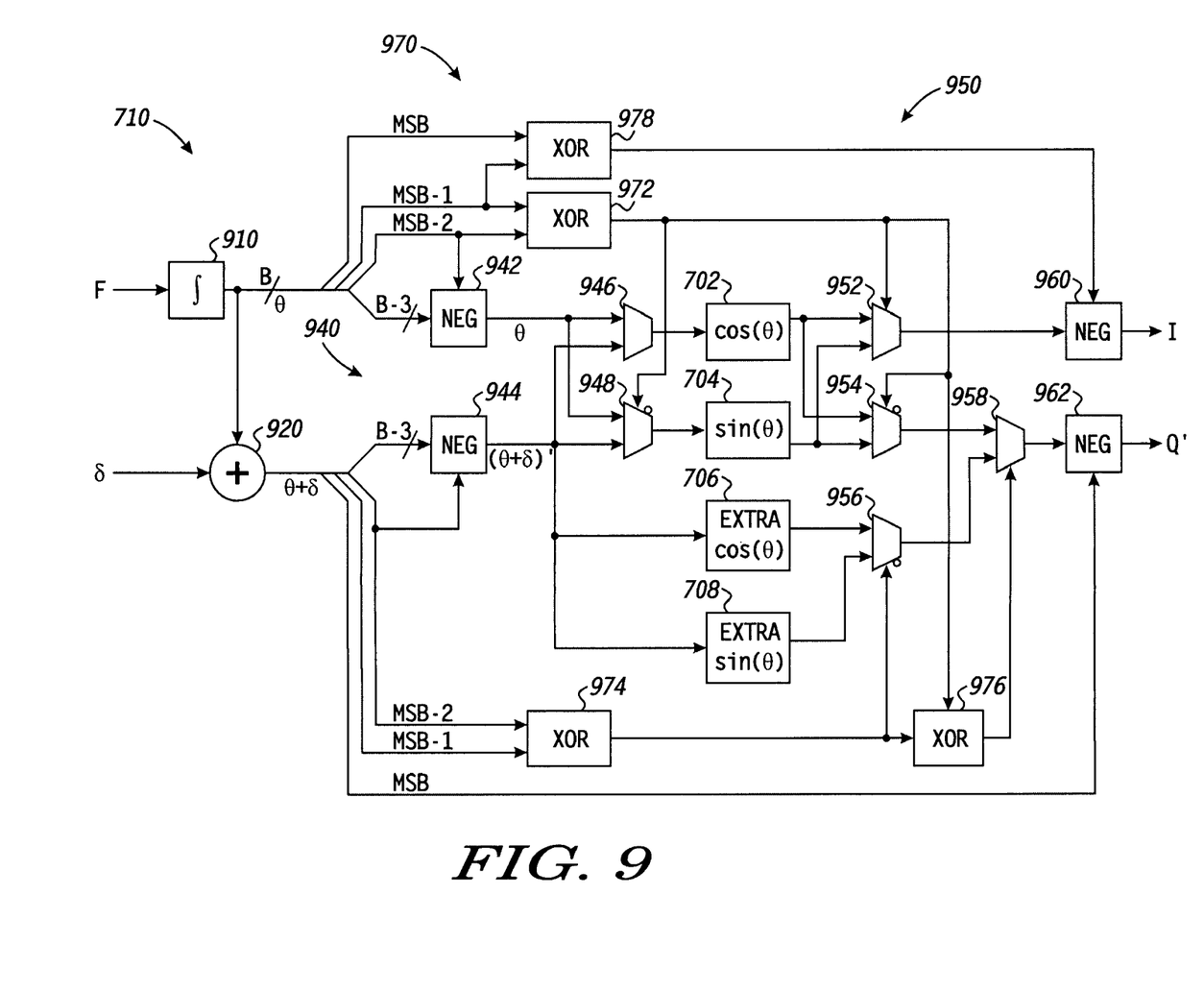
FIG. 9 illustrates in block diagram form a circuit implementation of the DDFS of FIG. 9.

The implementation of access circuit 710 can be better understood with reference to FIG. 9, which illustrates in block diagram form a circuit implementation of DDFS 700 of FIG. 7. Shown in FIG. 9 are cosine memory 702, sine memory 704, extra cosine memory 706, extra sine memory 708, and access circuit 710 as described generally with reference to FIG. 7. As shown in FIG. 9, access circuit 710 includes an integrator 910, an adder 920, an addressing circuit 940, an output circuit 950, and a control circuit 970. Integrator 910 has an input for receiving frequency control signal F, a clock circuit for receiving the CLOCK signal, and an output for providing the B-bit angle $\theta$. Adder 920 has a first input connected to the output of integrator 910, a second input for receiving the phase offset $\delta$, and an output for providing the B-bit angle ($\theta+\delta$).

Addressing circuit 940 includes a negater 942, a negater 944, a MUX 946, and a MUX 948. Negater 942 has an input for receiving the (B-3) least significant bits of angle $\theta$, a control input for receiving the MSB-2 of angle $\theta$, and an output for providing the modified angle $\theta'$. Negater 944 has an input for receiving the (B-3) least significant bits of angle ($\theta+\delta$), a control input for receiving the MSB-2 of angle ($\theta+\delta$), and an output terminal for providing a modified angle labeled "($\theta+\delta$)'" to the address inputs of extra cosine memory 706 and extra sine memory 708. MUX 946 has a first input connected to the output of negater 942, a second input connected to the output of negater 944, a control input, and an output connected to the address input of cosine memory 702. MUX 948 has a first input connected to the output of negater 942, a second input connected to the output of negater 944, an inverted control input, and an output connected to the address input of sine memory 704.

Output circuit 950 includes MUXes 952, 954, 956, and 958, a negater 960, and a negater 962. MUX 952 has a first input connected to the output of cosine memory 702, a second input connected to the output of sine memory 704, a control input, and an output. MUX 954 has a first input connected to the output of cosine memory 702, a second input connected to the output of sine memory 704, an inverted control input, and an output. MUX 956 has a first input connected to the output of extra cosine memory 706, a second input connected to the output of extra sine memory 708, an inverted control input, and an output. MUX 958 has a first input connected to the output of MUX 954, a second input connected to the output of MUX 956, a control input, and an output. Negater 960 has an input connected to the output of MUX 952, a control input, and an output for providing the I signal. Negater 962 has an input connected to the output of MUX 958, a control input for receiving the MSB of angle (θ+δ), and an output for providing the Q' signal.

Control circuit 970 includes XOR gates 972, 974, 976, and 978. XOR gate 972 has a first input for receiving the MSB−1 of angle θ, a second input for receiving the MSB−2 of angle θ, and an output connected to the control input of MUX 946, the inverted control input of MUX 948, the control input of MUX 952, and the inverted control input of MUX 954. XOR gate 974 has a first input for receiving the MSB−2 of angle (θ+δ), a second input for receiving the MSB−1 of angle (θ+δ), and an output connected to the inverted control input of MUX 956. XOR gate 976 has a first input connected to the output of XOR gate 972, a second input connected to the output of XOR gate 974, and an output connected to the control input of MUX 958. XOR gate 978 has a first input for receiving the MSB bit of angle θ, a second input for receiving the MSB−1 of angle θ, and an output connected to the control input of negater 960.

In operation, adder 920 is adapted to receive a variable phase offset δ and add it to the output of integrator 910 to provide the offset angle (θ+δ). In the illustrated embodiment of DDFS 700, access circuit 710 uses π/4 symmetry to access memories 702 and 704, which respectively store values of cosine and sine waveforms from 0 to π/4. DDFS 700 uses extra cosine memory 706 and extra sine memory 708 to provide values to reconstruct the delayed sine waveform while cosine memory 702 or sine memory 704 is still outputting values required to reconstruct the cosine waveform.

Addressing circuit 940 operates similarly to that of FIG. 6, except that it provides the modified offset angle (θ+δ) as to the address input of extra cosine memory 706 and extra sine memory 708, and selectively provides the modified offset angle (θ+δ) as the address to cosine memory 702 and sine memory 704. Negater 942 selectively inverts the B−3 bits of angle θ in response to whether the cycle is at an even or odd eighth of the cycle, determined by the MSB−2 of angle θ. Likewise negater 942 selectively inverts the B−3 bits of offset angle (θ+δ) in response to whether the cycle is at an even or odd eighth of the cycle, determined by the MSB−2 of offset angle (θ+δ). MUX 946 outputs the first input thereof during quadrants one and four of angle θ, and the second input thereof during quadrants two and three of angle θ, determined by XOR gate 972. MUX 948 outputs the first input thereof during quadrants two and three of angle θ, and the second input thereof during quadrants one and four of offset angle θ, determined by XOR gate 972.

Output circuit 950 also operates similarly to that of FIG. 6, except that it provides the Q' output based on the outputs of either cosine memory 702, sine memory 704, extra cosine memory 706, or extra sine memory 708. Output circuit 950 uses MUX 952 and negater 960 to output the cosine waveform. MUX 952 selects between the output of cosine memory 702 during the first, fourth, fifth, and eighth eighths of angle θ, and the output of sine memory 704 during the second, third, sixth, and seventh eighths of angle θ. Negater 960 selectively negates the output of MUX 972 during quadrants two and three of angle θ when the cosine waveform assumes a negative value.

Output circuit 950 uses MUXes 954, 956, and 958 and negater 962 to output the sine waveform. MUX 954 selects between the output of cosine memory 702 during the second, third, sixth, and seventh eighths of angle θ, and the output of sine memory 704 during the first, fourth, fifth, and eighth eighths of angle θ. MUX 956 selects between the output of extra cosine memory 706 during the first, fourth, fifth, and eighth eighths of offset angle (θ+δ), and the output of sine memory 704 during the second, third, sixth, and seventh eighths of offset angle (θ+δ). MUX 958 selects between the output of MUX 954 during periods of non-overlap between the cosine and offset sine waveforms, and the output of MUX 956 during periods of overlap between the cosine and offset sine waveforms. Negater 962 selectively negates the output of MUX 959 during quadrants three and four of offset angle (θ+δ) when the sine waveform assumes a negative value.

Control circuit 970 uses XOR gates 972, 974, 976, and 978 for the following functions. XOR gate 972 asserts its output at a logic high when angle θ is in the second, third, sixth, and seventh eighths of its cycle, and de-asserts its output at a logic low when angle θ is in the first, fourth, fifth, and eighth eighths of its cycle. XOR gate 974 asserts its output at a logic high when offset angle (θ+δ) is in the second, third, sixth, and seventh eighths of its cycle, and de-asserts its output at a logic low when offset angle (θ+δ) is in the first, fourth, fifth, and eighth eighths of its cycle. XOR gate 976 de-asserts its output at a logic low during periods of non-overlap between the cosine and offset sine waveforms, and asserts its output at a logic high during periods of overlap between the cosine and offset sine waveforms. XOR gate 978 asserts its output at a logic high when angle θ is in the second or third quadrants, and de-asserts its output at a logic low when angle θ is in the first or fourth quadrants.

Note that in the particular embodiment of DDFS 700 shown in FIG. 9, negaters 942 and 944 operate on signed addresses using one's complement arithmetic. If memories 702, 704, 706, and 708 stored normal sinusoidal data samples, then negaters 960 and 962 would need to be implemented using two's complement arithmetic. However two's complement negaters first take the one's complement of the input number and then add one to the least significant bit. Since two's complement negaters are more complex, DDFS 710 advantageously stores slightly modified data in memories 702, 704, 706, and 708 to allow negaters 960 and 962 to be implemented as simple one's complement negaters. From this discussion it should be apparent that the concepts described with respect to FIGS. 7-9 are applicable to various number system representations.

Figure 10:
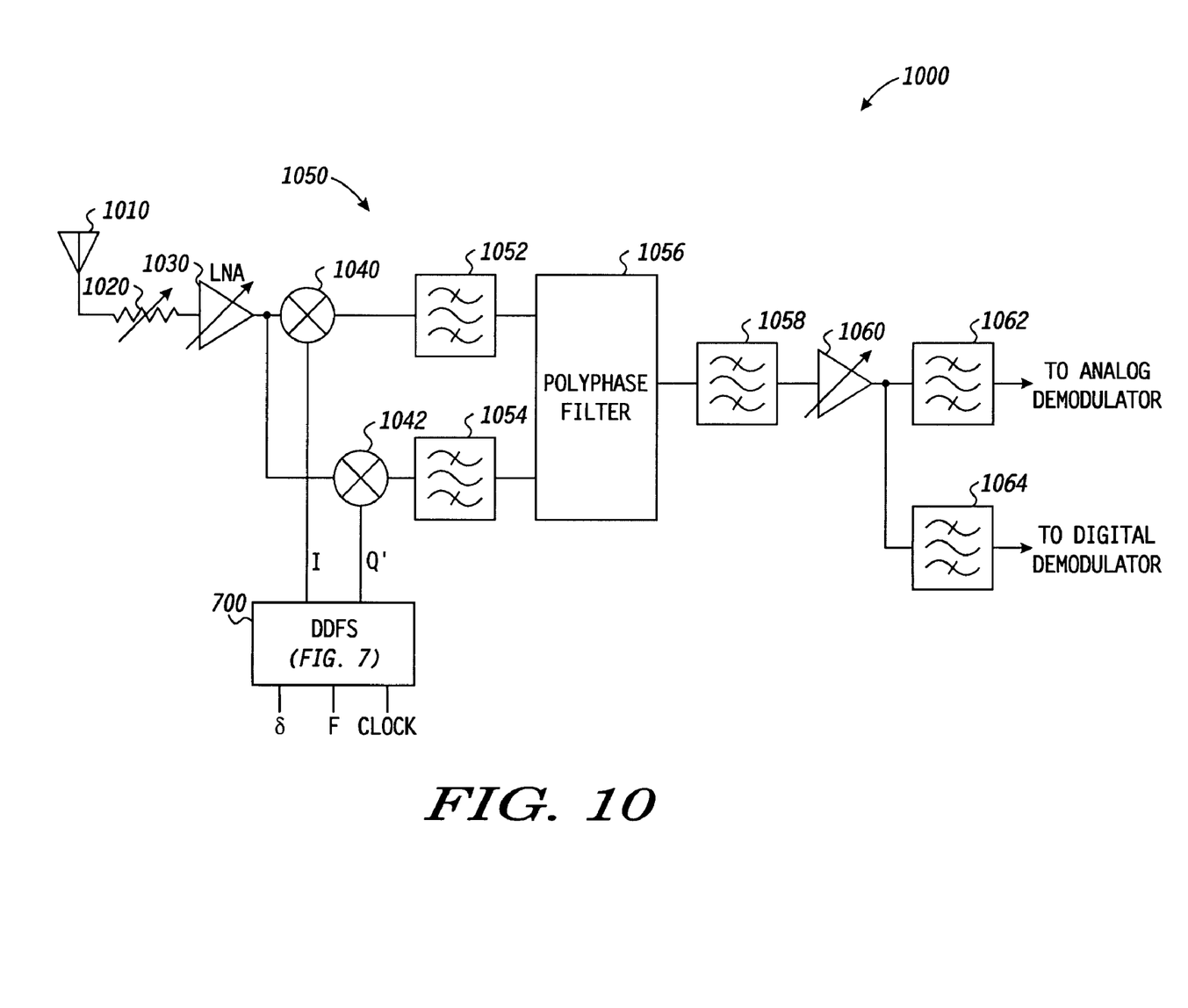
FIG. 10 illustrates in block diagram form a receiver using the DDFS of FIG. 7.

FIG. 10 illustrates in block diagram form a receiver 1000 using DDFS 700 of FIG. 7. FIG. 10 illustrates several components of the receiver that are useful in understanding the present invention but omits other components. In addition to DDFS 700 receiver 1000 also includes an antenna 1010, a variable attenuator 1020, a low noise amplifier (LNA) 1030, a mixer 1040, a mixer 1042, and a processing circuit 1050. Antenna 1010 receives a broadcast signal, which in the case of broadcast television has content in the frequency range of 44-864 MHz, but the characteristics of the broadcast signal may be different in other types of receivers. Variable attenuator 1020 has a first terminal connected to antenna 1010, a second terminal, and a control terminal for receiving an automatic gain control (AGC) signal from an AGC circuit (not shown in FIG. 10). LNA 1030 has an input terminal connected to the second terminal of variable attenuator 1020, an output terminal, and a control terminal for receiving another AGC signal from the AGC circuit.

Mixer 1040 has a first input terminal connected to the output terminal of LNA 1030, a second input terminal for receiving the I signal from DDFS 700, and an output terminal for providing signal $I_{IF}$. Mixer 1042 has a first input terminal connected to the output terminal of LNA 1030, a second input terminal for receiving the Q' signal from DDFS 700, and an output terminal for providing signal $Q_{IF}$. In one embodiment, DDFS 700 outputs digital cosine and sine signals and mixers 1040 may be implemented as disclosed in U.S. Pat. No. 6,778,117. In an alternate embodiment, DDFS 700 may further include digital to analog converters that convert the digital cosine and sine signals into analog signals, in which case mixers 1040 and 1042 would be conventional analog mixers.

Processing circuit 1050 includes generally bandpass filters 1052 and 1054, a polyphase filter 1056, a bandpass filter 1058, a programmable gain amplifier 1060, and surface acoustic wave (SAW) filters 1062 and 1064. Bandpass filter 1052 has an input for receiving the $I_{IF}$ signal, and an output. Bandpass filter 1054 has an input for receiving the $Q_{IF}$ signal, and an output. Polyphase filter 1056 has inputs connected to the outputs of bandpass filters 1052 and 1054, and an output. Bandpass filter 1058 has an input connected to the output of polyphase filter 1056, and an output. Programmable gain amplifier 1060 has an input connected to the output of bandpass filter 1058, an output, and a variable gain input. SAW filter 1062 has an input connected to the output of programmable gain amplifier 1060, and an output for providing a recovered signal to an analog demodulator, not shown in FIG. 10. SAW filter 1064 has an input connected to the output of programmable gain amplifier 1060, and an output for providing a recovered signal to a digital demodulator, also not shown in FIG. 10.

In operation, receiver 1000 is part of a broadcast television tuner in which a selected channel is tuned to a standard intermediate frequency, such as 44 MHz. Receiver 1000 provides outputs to separate analog and digital paths to allow detection of both types of signals by further circuitry not shown in FIG. 10.

The $I_{IF}$ and $Q_{IF}$ signals are differential signals, and polyphase filter 1056 filters and then sums these signals to perform image rejection. However component mismatches in the I and Q paths result in both an amplitude and phase distortion and prevent perfect image rejection. Receiver 1000 uses DDFS 700 to improve image rejection by introducing a phase offset δ into the sine (quadrature) path that compensates for a measured offset.

Receiver 1000 uses a calibration circuit, not shown in FIG. 10, to determine phase offset δ. In one form, the calibration circuit substitutes pure test tones at the image frequency of a frequency desired to be tuned for the received RF signal (corresponding to signal F input to DDFS 700). The calibration circuit then measures the energy in the filtered test tones at the output of polyphase filter 1056. In this manner, the calibration circuit is able to determine a measured phase error, and inputs phase offset δ to DDFS 700 to compensate for the measured phase error.

Note that while DDFS 700 of FIG. 7 uses π/4 symmetry to achieve especially small size, in another embodiment a DDFS 700 could include an access circuit that takes advantage of other symmetries inherent in the cosine and sine waveforms, such as π- or π/2-symmetry. Also the phase offset can be introduced into the I signal, the Q signal, or some combination thereof.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A direct digital frequency synthesizer comprising:
    a first memory for storing a plurality of digitized samples of a first portion of a sinusoidal waveform;
    a second memory for storing a plurality of digitized samples of a second portion of said sinusoidal waveform, wherein said first and second portions of said sinusoidal waveform together define a predetermined fraction of a whole cycle of said sinusoidal waveform;
    a first extra memory for storing a plurality of extra digitized samples of said sinusoidal waveform beyond said first portion;
    a second extra memory for storing a plurality of extra digitized samples of said sinusoidal waveform beyond said second portion; and
    an access circuit having a first input for receiving a phase offset and responsive to said digitized samples from said first and second memories and to said digitized samples of said first and second extra memories for outputting cosine and sine waveforms offset from a quadrature relationship with respect to each other by said phase offset.

2. The direct digital frequency synthesizer of claim 1, wherein said predetermined fraction is equal to one-fourth of said whole cycle of said sinusoidal waveform.

3. The direct digital frequency synthesizer of claim 1, wherein said predetermined fraction is equal to one-half of said whole cycle of said sinusoidal waveform.

4. The direct digital frequency synthesizer of claim 1, wherein said access circuit has a second input for receiving a frequency signal indicative of a frequency of said cosine and sine waveforms, and a third input for receiving a clock signal.

5. The direct digital frequency synthesizer of claim 4, wherein said access circuit comprises:
    an integrator having a first input for receiving said frequency signal, a second input for receiving said clock signal, and an output;
    a summing device having a first input coupled to said output of said integrator, a second input for receiving said phase offset, and an output;
    an addressing circuit having a first input coupled to said output of said integrator, a second input coupled to said output of said summing device, and outputs coupled to corresponding address inputs of said first and second memories and to said first and second extra memories; and
    an outputting circuit having inputs coupled to corresponding outputs of said first and second memories and said first and second extra memories, and outputs for providing said cosine and sine signals.

6. The direct digital frequency synthesizer of claim 5 wherein said addressing circuit comprises:
    a first negater having an input coupled to said output of said integrator, and an output;
    a second negater having an input coupled to said output of said summing device, and an output coupled to said address inputs of said first and second extra memories;
    a first multiplexer having a first input coupled to said output of said first negater, a second input coupled to said output of said second negater, and an output coupled to said address input of said first memory; and
    a second multiplexer having a first input coupled to said output of said first negater, a second input coupled to said output of said second negater, and an output coupled to said address input of said second memory.

7. The direct digital frequency synthesizer of claim 6 further comprising a control circuit having a first input coupled to said output of said integrator, a second input coupled to said output of said summing device, first and second outputs for selectively activating said first and second negaters, respectively, and third and fourth outputs for respectively selecting between inputs of said first and second multiplexers.

8. The direct digital frequency synthesizer of claim 5 wherein said outputting circuit comprises:
- a first multiplexer having a first input coupled to said output of said first memory, a second input coupled to said output of said second memory, and an output;
- a second multiplexer having a first input coupled to said output of said first memory, a second input coupled to said output of said second memory, and an output;
- a third multiplexer having a first input coupled to an output of said first extra memory, a second input coupled to an output of said second extra memory, and an output;
- a fourth multiplexer having a first input coupled to said output of said second multiplexer, a second input coupled to said output of said third multiplexer, and an output;
- a first negater having an input coupled to said output of said first multiplexer, and an output for providing said cosine signal; and
- a second negater having an input coupled to said output of said fourth multiplexer, and an output for providing said sine signal.

9. The direct digital frequency synthesizer of claim 8 further comprising a control circuit having a first input coupled to said output of said integrator, a second input coupled to said output of said summing device, and first and second outputs for selectively activating said first and second negaters, and third, fourth, fifth, and sixth outputs for respectively selecting between inputs of said first, second, third, and fourth multiplexers.

10. A method comprising:
- storing digitized samples of a first portion of a sinusoidal waveform in a first memory;
- storing digitized samples of a second portion of said sinusoidal waveform in a second memory, wherein said first and second portions of said sinusoidal waveform together define a predetermined fraction of a whole cycle of said sinusoidal waveform wherein said predetermined fraction exhibits symmetry with respect to said whole cycle;
- storing extra digitized samples of said sinusoidal waveform beyond said first portion in a first extra memory;
- storing extra digitized samples of the sinusoidal waveform beyond said second portion in a second extra memory;
- concurrently outputting cosine and sine waveforms offset from a quadrature relationship with respect to each other by said phase offset from said digitized samples of said first and second memories and said first and second extra memories.

11. The method of claim 10 further comprising forming said sine waveform from said second extra memory while forming said cosine waveform from said first memory.

12. The method of claim 11 further comprising forming said sine waveform from said first extra memory while forming said cosine waveform from said second memory.

13. The method of claim 10 further comprising forming said cosine waveform from said second extra memory while forming said sine waveform from said first memory.

14. The method of claim 13 further comprising forming said cosine waveform from said first extra memory while forming said sine waveform from said second memory.

15. A receiver comprising:
- a direct digital frequency synthesizer having a first input for receiving a phase offset, a first output for providing a first local oscillator signal, and a second output for providing a second local oscillator signal offset from a quadrature relationship with said first local oscillator signal by said phase offset;
- a first mixer having a first input for receiving a radio frequency (RF) signal, a second input for receiving said first local oscillator signal, and an output for providing an in-phase signal at another frequency; and
- a second mixer having a first input for receiving said RF signal, a second input for receiving said second local oscillator signal, and an output for providing a quadrature signal at said other frequency a first memory for storing a plurality of—digitized samples of a first portion of a sinusoidal waveform; a second memory for storing a plurality of digitized samples of a second portion of said sinusoidal waveform, wherein said first and second portions of said sinusoidal waveform together define a predetermined fraction of a whole cycle of said sinusoidal waveform; a first extra memory for storing a plurality of extra digitized samples of said sinusoidal waveform beyond said first portion; a second extra memory for storing a plurality of extra digitized samples of said sinusoidal waveform beyond said second portion; and an access circuit responsive to said digitized samples from said first and second memories and to said digitized samples of said first and second extra memories for outputting said first and second local oscillator signals.

16. The receiver of claim 15 further comprising:
- a processing circuit having a first input for receiving said in-phase signal, a second input for receiving said quadrature signal, and an output for providing a recovered signal in response thereto.

17. The receiver of claim 15, wherein said direct digital frequency synthesizer comprises:
- a first memory for storing a plurality of digitized samples of a first portion of a sinusoidal waveform;
- a second memory for storing a plurality of digitized samples of a second portion of said sinusoidal waveform, wherein said first and second portions of said sinusoidal waveform together define a predetermined fraction of a whole cycle of said sinusoidal waveform;
- a first extra memory for storing a plurality of extra digitized samples of said sinusoidal waveform beyond said first portion;
- a second extra memory for storing a plurality of extra digitized samples of said sinusoidal waveform beyond said second portion; and
- an access circuit responsive to said digitized samples from said first and second memories and to said digitized samples of said first and second extra memories for outputting said first and second local oscillator signals.

18. The receiver of claim 15 wherein said access circuit has a second input for receiving a frequency signal indicative of a frequency of said first and second local oscillator signals, and a third input for receiving a clock signal.

19. The receiver of claim 18, wherein said access circuit comprises:
- an integrator having a first input for receiving said frequency signal, a second input for receiving said clock signal, and an output;
- a summing device having a first input coupled to said output of said integrator, a second input for receiving said phase offset, and an output;

an addressing circuit having a first input coupled to said output of said integrator, a second input coupled to said output of said summing device, and outputs coupled to corresponding address inputs of said first and second memories and to said first and second extra memories; and an outputting circuit having inputs coupled to corresponding outputs of said first and second memories and said first and second extra memories, and outputs for providing said first and second local oscillator signals.

20. The receiver of claim 15, wherein said predetermined fraction is equal to one-fourth of said whole cycle of said sinusoidal waveform.

* * * * *